(12) United States Patent
Nagel et al.

(10) Patent No.: US 8,707,023 B2
(45) Date of Patent: Apr. 22, 2014

(54) SECURE TRANSFER OF BUSINESS DATA TO A HOSTED SYSTEM

(75) Inventors: Klaus Nagel, Walldorf (DE); Achim Seubert, Walldorf (DE); Oliver Rebholz, Walldorf (DE); Patrick Winkler, Walldorf (DE)

(73) Assignee: SAP AG, Walldorf (DE)

( * ) Notice: Subject to any disclaimer, the term of this patent is extended or adjusted under 35 U.S.C. 154(b) by 570 days.

(21) Appl. No.: 12/818,088

(22) Filed: Jun. 17, 2010

(65) Prior Publication Data

US 2011/0314272 A1 Dec. 22, 2011

(51) Int. Cl.
*H04L 29/06* (2006.01)

(52) U.S. Cl.
USPC .......................................................... 713/153

(58) Field of Classification Search
USPC .......................................................... 713/153
See application file for complete search history.

(56) References Cited

U.S. PATENT DOCUMENTS

| 6,633,875 | B2 * | 10/2003 | Brady .................... 705/36 R |
| 2003/0041063 | A1 * | 2/2003 | Brady ........................ 707/10 |
| 2004/0088318 | A1 * | 5/2004 | Brady ........................ 707/102 |
| 2007/0239858 | A1 * | 10/2007 | Banerji et al. ............ 709/220 |
| 2010/0211781 | A1 * | 8/2010 | Auradkar et al. ......... 713/168 |

* cited by examiner

*Primary Examiner* — William Powers
*Assistant Examiner* — Stephen Sanders
(74) *Attorney, Agent, or Firm* — Mintz Levin Cohn Ferris Glovsky and Popeo, P.C.

(57) ABSTRACT

A system and method for uploading data from a customer system to a hosted system is disclosed. A stub is integrated with a firewall between the customer system and the hosted system. The stub includes an inbound layer on the customer system side of the firewall and an outbound layer on the hosted system side of the firewall, and the inbound layer includes a write-only directory. A demon is connected between the inbound layer and the outbound layer of the stub. The demon is configured to recognize newly received data in the write-only directory of the inbound layer, encrypt the newly received data to generate encrypted data, and move the encrypted data to the outbound layer for access by the hosted system.

19 Claims, 3 Drawing Sheets

SECURE TRANSFER OF BUSINESS DATA TO A HOSTED SYSTEM

BACKGROUND

This disclosure relates generally to hosted application platforms, and more particularly to secure transfer of business data to a hosted system.

Software as a Service (SaaS) is a model for deploying application and other software over the Internet. Also known as "on-demand" software, SaaS-modeled applications are flexible, quick to deploy, and Web-based. In a typical SaaS model, an on-demand system such as a server hosts advanced software applications that can be accessed from a customer system such as a client computer, usually on a subscription basis. As part of the model, business data from the customer is uploaded from the customer system to the on-demand system where such business data can be processed cost-effectively and efficiently by the hosted software applications.

As SaaS model gains traction in the market, the requirement for data security for medium and large enterprises, as well as individual users, becomes increasingly more important. Robust data security is crucial for the success of any on-demand solution. What is needed is a solution for protecting against any type of compromise of critical business data from a customer system.

SUMMARY

In general, this document discloses a system and method that allow uploading of critical business data from a customer system to the on-demand system without any compromise on data security. The solution behind the disclosed system and method can be set up easily and without deep technology know-how for the customer, and can be used by almost any on-demand application that requires data to be loaded from the customer system.

In one aspect, a system for uploading data from a customer system to a hosted system is disclosed. The system includes a stub integrated with a firewall between the customer system and the hosted system. The stub includes an inbound layer on the customer system side of the firewall and an outbound layer on the hosted system side of the firewall, and the inbound layer includes a write-only directory. The system further includes a demon connected between the inbound layer and the outbound layer of the stub. The demon is configured to recognize newly received data in the write-only directory of the inbound layer, encrypt the newly received data to generate encrypted data, and move the encrypted data to the outbound layer for access by the hosted system.

In another aspect, a system for uploading data to a hosted system includes a customer system having a firewall between the customer system and the hosted system, and a stub integrated with the firewall. The stub includes an inbound layer on the customer system side of the firewall and an outbound layer on the hosted system side of the firewall, the inbound layer including a write-only directory. The system further includes a demon connected between the inbound layer and the outbound layer of the stub. The demon is configured to recognize newly received data in the write-only directory of the inbound layer, encrypt the newly received data to generate encrypted data, and move the encrypted data to the outbound layer for access by the hosted system.

In yet another aspect, a method of uploading data from a customer system to a hosted system is disclosed. The method includes writing data to an inbound layer of a stub integrated with a firewall between the customer system and the hosted system. The inbound layer is on the customer system side of the firewall and includes a write-only directory. The method further includes encrypting the data in the inbound layer to generate encrypted data in the write-only directory, moving the encrypted data from the write-only directory to an outbound layer of the stub, the outbound layer being on the hosted system side of the firewall, and uploading the encrypted data from the outbound layer of the stub to the hosted system.

In still yet another aspect, a method of uploading data from a customer system to a hosted system includes providing a stub between the customer system and the hosted system at a firewall of the customer system, the stub including an inbound layer on the customer system side of the firewall and an outbound layer on the hosted system side of the firewall. The method further includes writing data from the data extractor to the inbound layer of the stub, and encrypting the data in the inbound layer of the stub to generate encrypted data in the write-only directory. The method further includes moving the encrypted data from the write-only directory of the inbound layer to an associated folder of the outbound layer of the stub, and uploading the encrypted data from the outbound layer of the stub to the hosted system.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a system and method that secures critical business data against data compromise during uploading of that critical business data from a customer system to the hosted system.

Figure 1:
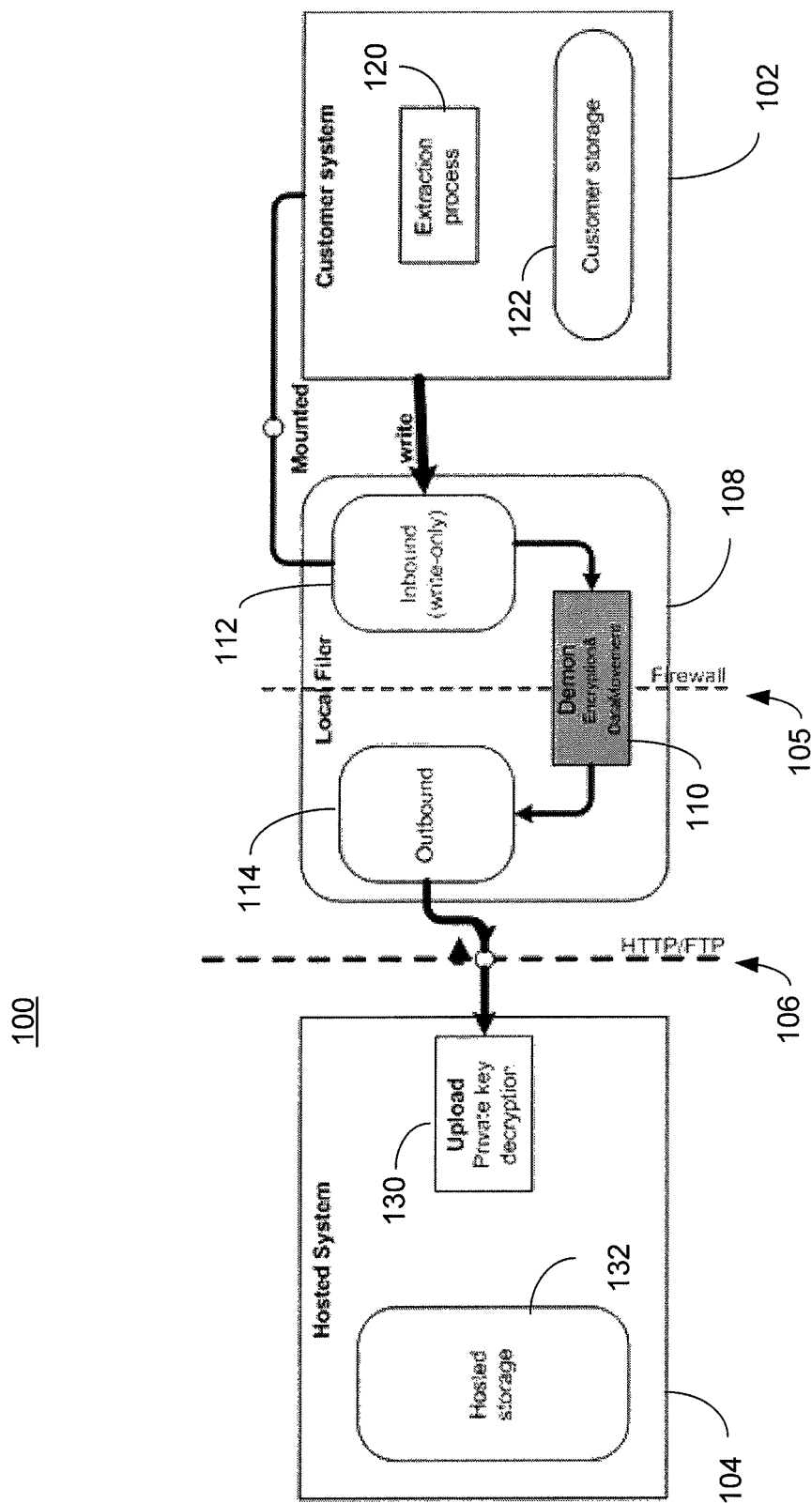
FIG. 1 is a block diagram of a data upload system.

FIG. 1 is a block diagram of a data upload system 100 for secure data transfer from a customer system 102 to a hosted system 104 over the Internet 106 in accordance with a hosted environment or SaaS model. The data upload system 100 utilizes a stub 108, a dedicated filer/storage that is set up between the customer system 102 and the hosted system 104 and that hosts and runs an encryption and data movement (EDM) demon 110. The stub 108 is partially outside of a firewall 105, which is any security mechanism implemented in either hardware or software, or both, to block unauthorized access to data communicated through it, or to permit specific authorized communications. The demon 110 is a dedicated and controlled process configured to shuffle data from inside of the firewall 105 to outside of the firewall 105, and automatically encrypt the data during this process.

Figure 2:
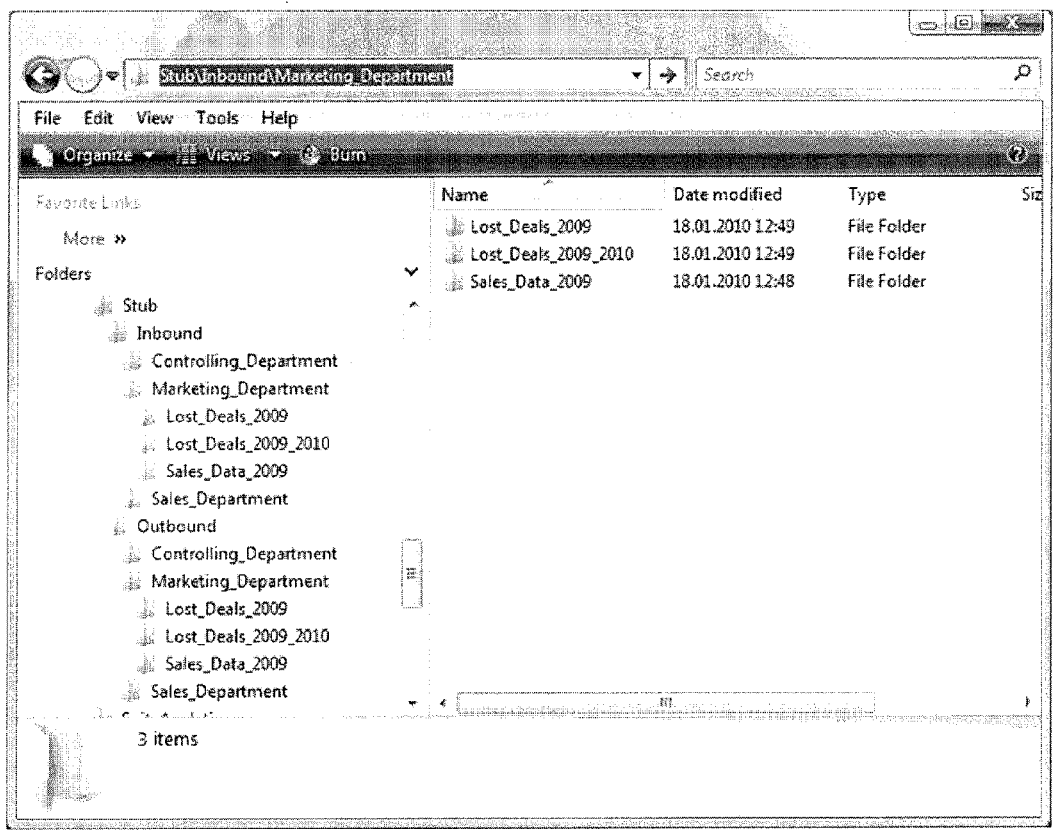
FIG. 2 shows an administrative interface for a secure data upload system.

The stub 108 can include a directory, which is split into an "inbound" part and "outbound" part. In some implementations, the inbound part and outbound part have identical structures, and are referred to hereafter as an inbound layer 112 and an outbound layer 114. The inbound layer 112 is within the customer firewall 105 and is mounted to the customer system 102. The inbound layer 112 of the directory is "write-only"

and provides no read access for users. The outbound layer 114 of the directory includes a mirrored directory structure from the inbound part. Read access is granted, and can be based on a role of each user for the upload of the data, as shown in FIG. 2. Access rights to the outbound layer 114 can be administrated by the customer according to company policies and user roles.

Access to data uploaded to the stub 108 from the customer system 102 is only on the outbound layer 114 of the stub 108. This way only encrypted data is available for download. A user who may not be authorized to see the actual data can still upload the data to the hosted system 104. Accordingly, a clear separation of roles within a business can be administrated.

The demon 110 executes a controlled process for shuffling data from inside of the firewall 105 to the outside, while automatically encrypting the data during this process. The demon 110 has only read access rights on the inbound layer 112 and only write access rights for the outbound layer 114. An application-specific extraction process 120 on the customer system 102 extracts data from a customer storage 122, and loads the data to the inbound layer 112 of the stub 108, and from which the demon 110 can access the data, encrypt it, and send encrypted data to the outbound layer 114.

In some implementations the demon 110 can be implemented as a simple shell script that scans the inbound layer 112 for newly arrived data. The newly arrived data is then encrypted and moved to a corresponding folder in the outbound layer 114. The scan can be periodic, or can be triggered manually or by the end of the load to the inbound layer 112. Standard tools for encryption methodologies can be employed depending on the license policies of the hosting company and the customer. Some implementations may use a public-private key (or asymmetric) encryption methodology. In such implementations, the hosting company may provide a public key for the encryption process. A private key, that can be used to decrypt the encrypted data, is available at the hosting company and can be used by the hosting company to decrypt the data. An upload module 130 in the hosted system 104 uploads the encrypted data from the outbound layer 114 of the stub 108, decrypts the data, and stores the decrypted data in a hosted storage 132 associated with the hosted system 104. Once in the hosted storage 132, the data is secured and only accessible according to access rules. Further, the hosted system 104 can process the data using any hosted solution.

Figure 3:
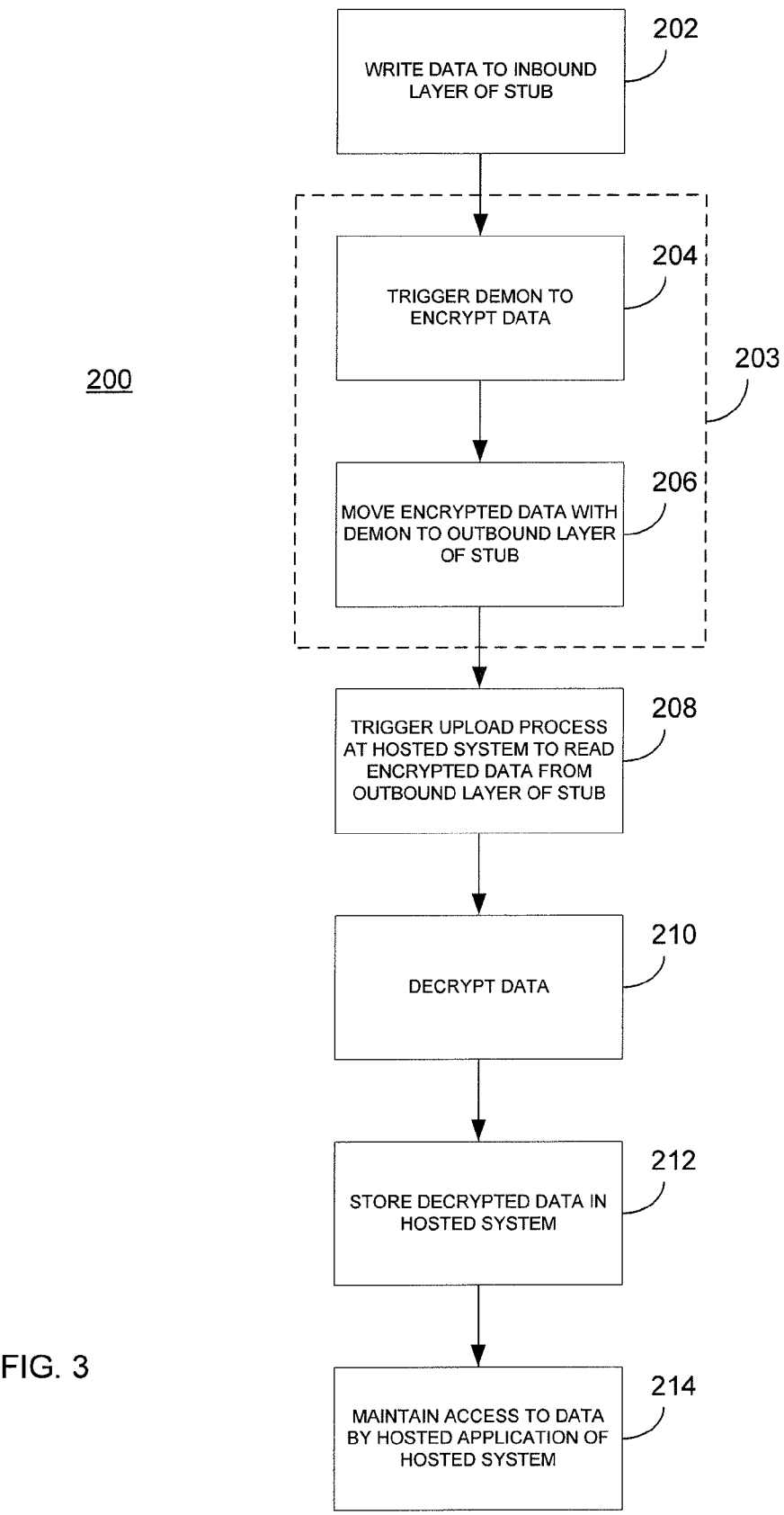
FIG. 3 is a flowchart of a secure data upload method.

FIG. 3 is a flowchart of a data upload process 200 in a SaaS modeled environment. The data upload process 200 enables secure data upload from a customer system to a hosted system. With reference also to FIG. 1, the data upload process 200 can be executed on the system 100 as follows: At 202, an application specific data extraction process in the customer system writes the data from a customer storage to the inbound layer of the stub. The inbound layer is write-only, without providing read access. This data extraction process can be triggered by an administrator who is authorized to run the process, although the administrator need not necessarily be authorized to read the actual data. The data can be written in clear text, but since it is still within the customers firewall and no user has read access to the inbound layer, the data is secured.

At 204, the EDM demon is triggered, either by instruction from the administrator, the data extraction process or other program, or the EDM demon automatically detects new arrived data in the inbound layer to be triggered. The demon executes an encryption and data movement subprocess 203 of the data upload process 200. At 204, the demon encrypts the data from the inbound layer, and at 206 moves the encrypted data to the outbound layer. Data encryption can be done using a public encryption key provided by, the hosting system. The encryption and data movement can be part of a simple program provided by the hosting system and installed on the stub.

At 208, an upload process is triggered from the hosted system to read the encrypted data from the outbound layer. At 210, the data is decrypted at the hosted system. In some implementations, the decryption is done using the private key. At 212, the data is stored in the hosted system. The data can be stored as clear text so it is available for the hosted application. The upload process can be triggered by any user that has access rights to the outbound layer of the stub. The user need not necessarily have the authorization to actually see the data (in general the user only may see parts of the data). Since in most implementations, the user can only view the encrypted data, access protection is still provided. Further data access is then maintained in the hosted application at 214.

EXAMPLE

A system and method for secure data upload to a hosted application can be illustrated using the following example. The marketing department of Company A wants to use sales data stored in a data warehouse, such as, for example, the NetWeaver Business Warehouse provided by SAP AG of Walldorf, Germany. Company A wants to load the data to a hosted analytics platform for agile and ad-hoc data reporting and exploration. The sales data is highly sensitive for Company A, which has restricted access to the sales data based on a user's role in the company, i.e. perhaps only to the managers of the sales department. For security, Company A can establish a stub for any outgoing business data, including the sales data. The business data contains files with facts, master data and texts, hierarchies, authorization settings and a model description.

The marketing department can request to have this business data loaded to the stub. An extraction process is triggered by the administrator of the stub. The administrator is authorized for this backend transaction and has write-access to the inbound layer of the stub. But he is not authorized to see the complete data. When he reports on the same dataset, he is restricted only to the set of data as described and modeled in the authorization settings. Therefore, the inbound layer that contains the clear text is not readable.

The data files are written to the inbound layer of the stub. The EDM demon detects the new data and encrypts it and moves the files to the corresponding folder in the outbound layer of the stub. A "power user" of the marketing department has read access rights to the outbound layer of the stub via a hosted application, an "Analytics Datamart". He can log-on to the webpage provided by the hosting system, and from the webpage can trigger a data upload process.

The data is read from the stub to the hosted Analytics Datamart, decrypted and stored in appropriate format for reporting and exploration. The power user may have no rights beyond starting the process, so he can not interfere and see the decrypted data. The users of the marketing department can log on to the Analytics Datamart to do reporting and searching on the uploaded sales data. They can see the data according to the uploaded security settings, or according to any additional settings that were set for the hosted application or by the hosted system.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard, disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate implementations may also be provided in combination in a single embodiment. Conversely, various features which, for brevity, are described in the context of a single implementation may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. For instance, the newly received data in the inbound layer can be moved first, and then encrypted, or encrypted as it is moved from the inbound layer to the outbound layer.

In addition, implementations of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A system for uploading data from a customer system to a hosted system, the system comprising:

a stub integrated with a firewall between the customer system and the hosted system, the stub including an inbound layer on the customer system side of the firewall and an outbound layer on the hosted system side of the firewall, the inbound layer and the outbound layer of the stub comprised of a directory, each directory being formed of a plurality of folders, and each folder being associated with a corresponding folder in the other of the inbound layer or the outbound layer, the directory of the inbound layer comprising a write-only directory; and a demon connected between the inbound layer and the outbound layer of the stub, the demon being configured to recognize newly received data in the write-only directory of the inbound layer by scanning the inbound layer, encrypt the newly received data to generate encrypted data, and move the encrypted data to the outbound layer for access by the hosted system.

2. The system in accordance with claim 1, wherein the demon is comprised of a shell script.

3. The system in accordance with claim 1, wherein the demon encrypts the newly received data according to a public-private key encryption standard.

4. The system in accordance with claim 3, further comprising a private key decryption module integrated with the hosted system, the private key decryption module being configured to decrypt the encrypted data according to a decryption program associated with the public-private key encryption standard to generate decrypted data.

5. The system in accordance with claim 4, wherein the decrypted data includes clear text.

6. The system in accordance with claim 1, wherein the write-only directory is connected to a data extractor of the customer system to receive data in a write operation by the data extractor.

7. A system for uploading data to a hosted system, the system comprising:

a customer system having a firewall between the customer system and the hosted system;

a stub integrated with the firewall, the stub including an inbound layer on the customer system side of the firewall and an outbound layer on the hosted system side of the firewall, the inbound layer and the outbound layer of the stub comprised of a directory, each directory being formed of a plurality of folders, and each folder being associated with a corresponding folder in the other of the inbound layer or the outbound layer, the directory of the inbound layer comprising a write-only directory; and a demon connected between the inbound layer and the outbound layer of the stub, the demon being configured to recognize newly received data in the write-only directory of the inbound layer by scanning the inbound layer, encrypt the newly received data to generate encrypted data, and move the encrypted data to the outbound layer for access by the hosted system.

8. The system in accordance with claim 7, wherein the demon is comprised of a shell script.

9. The system in accordance with claim 7, wherein the demon encrypts the newly received data according to a public-private key encryption standard.

10. The system in accordance with claim 9, further comprising a private key decryption module integrated with the hosted system, the private key decryption module being configured to decrypt the encrypted data according to a decryption program associated with the public-private key encryption standard to generate decrypted data.

11. The system in accordance with claim 10, wherein the decrypted data includes clear text.

12. The system in accordance with claim 7, wherein the write-only directory is connected to a data extractor of the customer system to receive data in a write operation by the data extractor.

13. A method of uploading data from a customer system to a hosted system, the method comprising:

writing data to an inbound layer of a stub integrated with a firewall between the customer system and the hosted system, the inbound layer being on the customer system side of the firewall and including a write-only directory;

scanning the inbound layer for the data;

encrypting the data in the inbound layer to generate encrypted data in the write-only directory;

moving the encrypted data from the write-only directory to an outbound layer of the stub, the outbound layer being on the hosted system side of the firewall; and uploading the encrypted data from the outbound layer of the stub to the hosted system, wherein the inbound layer and the outbound layer of the stub are comprised of a directory, each directory being formed of a plurality of folders, and each folder being associated with a corresponding folder in the other of the inbound layer or the outbound layer.

14. The method in accordance with claim 13, wherein encrypting the data and moving the encrypted data is executed by a shell script.

15. The method in accordance with claim 13, wherein the data is encrypted according to a public-private key encryption standard to generate the encrypted data.

16. The method in accordance with claim 15, further comprising decrypting the encrypted data according to a decryption program associated with the public-private key encryption standard to generate decrypted data.

17. The method in accordance with claim 16, wherein the decrypted data includes clear text.

18. A method of uploading data from a customer system to a hosted system, the method comprising:

providing a stub between the customer system and the hosted system at a firewall of the customer system, the stub including an inbound layer on the customer system side of the firewall and an outbound layer on the hosted system side of the firewall, the inbound layer and the outbound layer of the stub comprised of a directory, each directory being formed of a plurality of folders, and each folder being associated with a corresponding folder in the other of the inbound layer or the outbound layer;

writing data from a data extractor to the inbound layer of the stub;

scanning the inbound layer for the data;

encrypting the data in the inbound layer of the stub to generate encrypted data in a write-only directory of the inbound layer;

moving the encrypted data from the write-only directory of the inbound layer to a corresponding folder of the outbound layer of the stub; and uploading the encrypted data from the outbound layer of the stub to the hosted system.

19. A non-transitory computer-readable medium containing instructions to configure a processor to perform operations comprising:

writing data to an inbound layer of a stub integrated with a firewall between the customer system and the hosted system, the inbound layer being on the customer system side of the firewall and including a write-only directory;

scanning the inbound layer for the data;

encrypting the data in the inbound layer to generate encrypted data in the write-only directory;

moving the encrypted data from the write-only directory to an outbound layer of the stub, the outbound layer being on the hosted system side of the firewall; and uploading the encrypted data from the outbound layer of the stub to the hosted system, wherein the inbound layer and the outbound layer of the stub are comprised of a directory, each directory being formed of a plurality of folders, and each folder being associated with a corresponding folder in the other of the inbound layer or the outbound layer.

* * * * *